United States Patent [19]

Saam et al.

[11] Patent Number: 4,780,519

[45] Date of Patent: Oct. 25, 1988

[54] METHOD OF PRODUCING POLYDIORGANOSILOXANE GUM

[75] Inventors: John C. Saam; Leo F. Stebleton, both of Midland, Mich.

[73] Assignee: Dow Corning Corporation, Midland, Mich.

[21] Appl. No.: 129,253

[22] Filed: Dec. 7, 1987

Related U.S. Application Data

[63] Continuation-in-part of Ser. No. 923,467, Oct. 27, 1986, abandoned.

[51] Int. Cl.$^4$ ............................................. C08G 77/06
[52] U.S. Cl. ........................................ 528/14; 528/21; 528/23; 528/37; 556/450; 556/460; 556/462; 556/467
[58] Field of Search ................... 528/37, 14, 21, 23; 556/462, 450, 460, 467

[56] References Cited

U.S. PATENT DOCUMENTS

| | | | |
|---|---|---|---|
| 2,546,036 | 3/1951 | Marsden | 260/46.5 |
| 2,634,252 | 4/1953 | Warrick | 260/46.5 |
| 3,433,765 | 3/1969 | Geipel | 260/46.5 |
| 4,122,247 | 10/1978 | Evans | 528/14 |
| 4,439,592 | 3/1984 | Maass et al. | 528/14 |
| 4,551,515 | 11/1985 | Herberg et al. | 528/18 |
| 4,719,276 | 1/1988 | Stebleton | 528/37 |

*Primary Examiner*—Melvyn I. Marquis
*Attorney, Agent, or Firm*—Edward C. Elliott

[57] ABSTRACT

During the polymerization of diorganocyclosiloxane, to produce a polymer for use in manufacturing silicone rubber, a small amount of —SiOH is formed. The amount of —SiOH present in the polymer can be controlled by controlling the water vapor pressure present in the reaction container during polymerization.

6 Claims, No Drawings

METHOD OF PRODUCING POLYDIORGANOSILOXANE GUM

This is a continuation-in-part of copending application Ser. No. 923,467, filed on Oct. 27, 1986, and now abandoned.

BACKGROUND OF THE INVENTION

1. Field of the Invention

This invention relates to a method of polymerizing diorganocyclosiloxane to yield polydiorganosiloxane gum having a controlled low reactivity with reinforcing silica filler.

2. Background Information

In the commercial production of heat cured silicone elastomers, a polydiorganosiloxane gum is mixed with reinforcing silica to give the final elastomer useful physical properties. The mixture of polydiorganosiloxane gum and reinforcing silica reacts to form a crepe, upon aging, if special precautions are not taken. The most common method of preventing crepe is the addition of a short chain, hydroxyl endblocked polydiorganosiloxane fluid. It is postulated that the short-chain fluid reacts with the reinforcing silica preferentially over the gum, so that the gum and reinforcing filler do not form a crepe upon aging.

Evans teaches in U.S. Pat. No. 4,122,247, issued Oct. 24, 1978, that the water content of cyclic siloxanes can be reduced by heating to 100° C. or above with a nitrogen purge to an amount of less than 10 parts per million.

U.S. Pat. No. 4,439,592, issued Mar. 27, 1984, to Maass et al., discusses the preparation of triorganosilyl-terminated polydiorganosiloxanes. They point out that small amounts of water, in the basic polymerization, lead to Si—OH groups at the chain ends of the polymer. As a result, the properties of the polymers, for example the interaction with fillers, are very adversely effected. Their patent discloses a method of producing an improved polymer by distilling off a part of the cyclic diorganosiloxane, before polymerizing, in the presence of the polymerization catalyst at a temperature which is at least 10° C. below the temperature at which polymerization begins. A dry inert gas can be passed in during the distillation and prior to it as a further drying measure.

U.S. Pat. No. 4,551,515, issued Nov. 5, 1985 to Herberg et al. teaches that their mixture of cyclopolysiloxane and chainstopping agent is preferably dried before addition of the polymerizing catalyst to eliminate water which will terminate or chainstop diorganopolysiloxane polymer with silanol groups and thus reduce the viscosity of the polymer and change the nature of it's interaction with a filler. They further teach that after the polymerization is complete and the catalyst has been neutralized, if desired, the polymer can be devolatilized to remove volatiles such as cyclopolysiloxane.

SUMMARY OF THE INVENTION

The amount of silanol ends in a polydiorganosiloxane gum can be controlled by polymerizing under conditions of controlled water vapor pressure in the polymerization container. By removing water during the polymerization process, the amount of silanol ends can be reduced and controlled.

DESCRIPTION OF THE INVENTION

This invention relates to a method for controlling the amount of silanol ends remaining after the polymerization of diorganocyclosiloxane in the presence of acid or base catalyst comprising, (A) polymerizing in a sealed container having an inert gaseous sweep of controllable water vapor pressure diorganocyclosiloxane in the presence of acid or base catalyst under conditions of controlled water vapor pressure, the dew point of the exiting gaseous sweep being less than −10° C., then (B) terminating the polymerization process and neutralizing the catalyst before exposure to uncontrolled water vapor in the atmosphere.

The method of this invention relates to the procedures used during the polymerization of diorganocyclosiloxane monomers to high molecular weight polymers. The general method of polymerization will be discussed, then the particular method of this invention will be explained.

In the preparation of silicone elastomers, it is necessary to prepare polymers of high molecular weight. The preferred starting material is octamethylcyclotetrasiloxane. In commercial operations, there is normally a very small amount of other cyclic materials present as impurities as well as small amounts of water which, in the polymerization process leads to —SiOH groups at the chain ends and small amounts of linear siloxane diols such as $HO(Me_2Si)_xH$ where x is 3 to 7. For use in peroxide-cured silicone rubber and in silicone rubber crosslinked via the addition of —SiH groups to vinyl radicals. it is necessary to produce polymers with a very low amount of —SiOH present. The method of this invention has been found to assist in the production of gums having a controlled amount of —SiOH content.

Suitable cyclic siloxanes are of the general formula $(R_2SiO)_x$ where x is preferably 4 with minor amounts of from 3 to 8 present as impurities, R is a substituted or unsubstituted alkyl or alkenyl hydrocarbon radical. Preferably R is selected from the group consisting of methyl ethyl, phenyl, vinyl, and 3,3,3-trifluoropropyl radicals.

The chain length of the finished polymer is regulated by the addition of a chainstopping agent. Chainstopping agents are siloxanes having end groups of the formula $R^4_3Si$— where $R^4$ is a substituted or unsubstituted alkyl or alkenyl hydrocarbon radical, preferably methyl or vinyl radical. Sufficient chainstopping agent is added so that there is the proper amount of endblocking available to stop the polymerization at the desired average molecular weight.

The polymerization of the monomer is catalyzed with either acid or base catalysts using the materials well known in the art; such as those taught in U.S. Pat. No. 2,546,036, issued Mar. 20, 1951 to Marsden, U.S. Pat. No. 2,634,252, issued Apr. 7, 1953 to Warrick, and U.S. Pat. No. 3,433,765, issued Mar. 18, 1969 to Geipel, all of which are incorporated by reference to show examples of suitable catalysts.

Suitable acid catalysts are sulfuric acid and trifluoromethylsulfonic acid. These acid catalysts are neutralized after the polymerization is completed with alkaline materials.

Suitable basic polymerization catalyst is preferably used to catalyze the polymerization process. Suitable catalysts are the alkali metal hydroxides or their corresponding silanolates, such as potassium hydroxide, sodium hydroxide, cesium hydroxide, potassium silanolate, sodium silanolate, and cesium silanolate, with potassium silanolate being preferred. Also suitable are quaternary ammonium hydroxide, or phosphonium hydroxide, or their silanolates. The amount of catalyst is in the range of from 5 to 500 parts catalyst per million parts of diorganocyclosiloxane.

Usually polymerization of diorganocyclosiloxanes is carried out by mixing the diorganocyclosiloxane with chainstopping agent and with catalyst, then allowing the mixture to equilibrate, normally accelerating the equilibration by heating. Because any water or moisture present during the polymerization can end up as endblocking in the form of $-SiR_2OH$ groups, the polymerization is carried out at temperatures above 100° C. to lower the amount of water in the reaction mixture. It is desirable to dry the ingredients before the polymerization is started by distilling off part of the ingredients or by exposing the ingredients to drying means such as molecular sieves. The polymerization can be a batch process or a continuous process. The polymerization is normally carried out over a period of from a few minutes in the continuous processes to several hours in batch processes. The temperature is usually from 100° C. to 200° C. with temperatures from 150° C. to 180° C. preferred.

After the polymerization mixture has equilibrated, the catalyst is neutralized. The material used to neutralize the catalyst is dependent upon the type of catalyst used. When an acid catalyst is used, it is neutralized with a base; when a basic catalyst is used, it is neutralized with an acid.

After the catalyst is neutralized. the mixture is heated, usually under vacuum. to remove the volatile materials. primarily the equilibrium diorganocyclosiloxanes.

When diorganopolysiloxane is produced according to the above described procedure, there is a small amount of SiOH groups present on the polymer. The number of groups present can be reduced by carefully drying the ingredients used in the polymerization. The polydiorganocyclosiloxane used in commercial processes can normally contain about 100 parts per million by weight of free water and about 5 ppm of hydroxyl group in linear polydiorganodisilanols which are present as impurities. The drying of the ingredients, such as by passing through molecular sieves or by purging with a dry gas, can remove a portion of the free water, but these processes do not remove the hydroxyl groups on the linear polydiorganodisilanols. Maass et al teach, in U.S. Pat. No. 4,439,592, issued Mar. 27, 1984, that their process of distilling the cyclic diorganosiloxane in the presence of the polymerization catalyst results in a dryer mixture than when the cyclics are distilled without the polymerization catalyst present. However, since they teach that the temperature of distillation must be below the temperature at which polymerization begins, their procedure would not effect the hydroxy groups present on the linear polydiorganodisilanols. It has now been found that the number of $-SiOH$ groups, present in the polydiorganosiloxane from all sources, can be lowered, and controlled at a given level, by carefully regulating the equilibrium water vapor pressure in the reaction container during the polymerization process. By regulating and controlling the equilibrium water vapor pressure, the amount of $-SiOH$ groups can be regulated and controlled; rather than being a random, unregulated amount; as is the case in the normal methods of polymerization.

A convenient method of regulating the water vapor pressure is through the use of a controlled nitrogen sweep through the reaction container during the polymerization. The reaction container is sealed so that the atmosphere inside the container can be controlled at a desired water vapor level. The amount of water in the nitrogen is carefully controlled so that the water vapor pressure is at the desired level. A nitrogen stream having a low level of water vapor present can be obtained by using the nitrogen vented off of a container of liquid nitrogen. Using such a source can yield nitrogen having a dew point of $-50°$ C. leaving the operating reactor. A nitrogen stream having a high level of water vapor present can be obtained by using a cylinder of compressed nitrogen gas and passing it through a container of water to give a saturated nitrogen gas stream. By using both nitrogen streams, controlling the relative amounts of each stream used with adjustable valves, and combining them to give one stream of controlled equilibrium water vapor pressure to sweep the reaction container; the equilibrium water vapor pressure in the container can be controlled. A dew point meter placed in the exit stream from the reaction container is used to determine the amount of water vapor pressure present in the reaction container. Dew points from 0° C. to $-50°$ C. are thus easily produced and controlled.

When the water vapor pressure inside the reaction container is controlled, the polymerizing mass approaches equilibrium with the atmosphere over the mass. The number of polymer ends that are endblocked by hydroxyl groups is determined by the amount of water vapor present. The lower the water vapor pressure, the lower the number of ends that are endblocked by hydroxy groups. When the water vapor pressure is such that the dew point of the exiting gas is $-10°$ C. the number of hydroxyl endblocking groups is such that a polydimethylsiloxane, having a number average molecular weight of about 180,000 has an activity of about 66. Activity is a measure of the number of hydroxyl groups in a polymer; the higher the activity number, the higher the amount of hydroxyl groups. When the dew point of the exiting gas is $-30°$ C., a polydiorganosiloxane, having a number average molecular weight of about 289,000, has an activity of about 35.

The reactions of the polymerizing mass are stopped by neutralizing the polymerization catalyst before exposure of the polymer to uncontrolled water vapor in the atmosphere. Once the catalyst is neutralized, the polymer may be exposed to atmospheric moisture without affecting the amount of hydroxy endblocking in the polymer. The polymer is then heated, preferably under vacuum, to remove any volatile materials present.

The devolatilized polydiorganosiloxane. having a controlled amount of silanol ends present in the polymer produced, is suitable for use in peroxide vulcanized silicone rubber having reinforcing silica present because the controlled amount of $-SiOH$ groups present in the polymer means that there is a controlled interaction between the silica filler and the polymer. This interaction is thought to be responsible for the hardening of silica reinforced silicone rubber upon aging after manufacture, known in the industry as "crepe hardening". Because the amount of $-SiOH$ is controlled, the amount of crepe hardening is also controlled.

A polymer with a controlled amount of hydroxyl content is very useful in high consistency gum for use in silicone adhesives, as well as in producing moisture curable silicone sealants. A moisture activated crosslinker is used in such systems which reacts with hydroxy present in the polymer. Since the amount of crosslinking is affected by the amount of hydroxy present the modulus of the resulting cured elastomer is dependent upon the hydroxyl content. A controlled hydroxy content allows a sealant to be produced having a controlled modulus.

The following example is included for illustrative purposes only and should not be construed as limiting the invention, which is properly set forth in the appended claims.

EXAMPLE 1

A series of polymerizations were carried out in which the only variable was the equilibrium moisture level in the polymerization container.

A high shear mixer having a jacket for heating and cooling was equipped with a soft metal gasket so that the mixing chamber could be sealed. The mixer was equipped with a sealable port through which ingredients could be added without opening the mixer. It also had a port through which nitrogen could be added and an exhaust port to carry the nitrogen and any water or volatile materials out of the chamber. This exhaust port was connected to a dew point meter to continuously monitor the dew point of the gas leaving the mixer chamber.

The nitrogen port was connected to a container of liquid nitrogen as a source of dry nitrogen, there being a meter and a valve in the line to measure and control the amount of nitrogen flowing into the mixer. There was also a container of gaseous nitrogen connected to the port in such a manner that the nitrogen could be passed through a water container on the way to the mixer and also through a meter and valve, so that a stream of moist nitrogen could be passed into the mixer. By regulating the relative amounts of dry and moist nitrogen that passed to the mixer, the moisture content in the mixer could be regulated, measuring the moisture content by the dew meter on the exit line.

A quantity of starting ingredients were prepared by first mixing 3030 g of commercial dimethycyclotetrasiloxane with 3.64 g of dimethylvinylsiloxy endblocked polydimethylsiloxane having about 5 dimethylsiloxane units per molecule as source of endblocking siloxy groups. A catalyst mixture was prepared by mixing potassium silanolate with 6 percent of $(Me_2ViSi)_2O$ and allowing to equilibrate to give a liquid having 32,500 parts per million of potassium and 60,000 parts per million of $(Me_2ViSi)_2O$. A neutralizing agent was prepared by mixing an equal molar quantity of $Me_2ViSiOAc$ and $(Me_2ViSi)_2NH$.

The mixer was closed and sealed, then heated, by introducing steam into the mixer jacket, to a temperature of 100° C. to remove any moisture present in the mixer. Then a large syringe was used to inject 272.5 g of the above mixture of cyclic siloxane and endblocker into the mixer. A stream of nitrogen was passed through the mixer to regulate the moisture content of the mixer chamber as measured by the dew point of the exiting gas. The dew point was held at −30° C. for the first run. When first started, the dew point was high because of moisture in the mixture of cyclics, about −5° C. This moisture was removed by the heat and dry nitrogen. When the moisture level was at the desired point, −30° C. (about 25 minutes after starting) 0.21 g of the catalyst mixture was injected (25 parts per million of catalyst based upon the cyclic siloxane amount) without allowing any moisture into the mixer. Immediately after injection of the catalyst, the dew point rose sharply, to about −10° C., then slowly came down again. The mixture was polymerized over a period of about 85 minutes, during which time the steam pressure in the mixer jacket was increased to 70 psig (482 kPa). The polymerization continued for 4 hours to insure equilibrium at the −30° C. dew point equilibrium moisture content. After the polymerization period, 2.72 g of the neutralizing agent was injected and mixing continued for 10 minutes to insure mixing and reaction. Then the mixture was devolatilized by opening the mixer, increasing the steam pressure to 175 psig (1206 kPa) and directing a sweep of compressed air over the surface of the mixing mass for about 20 to 30 minutes. The polymer was then removed from the mixer and tested for properties as shown in Table I.

A series of runs were performed as above, but varying the equilibrium moisture content as shown in Table I by varying the amount and source of the nitrogen sweep during the polymerization as discussed above. The results of the runs are shown in Table I.

The plasticity of the polymer was measured in accordance with ASTM D 926 where the number shown is plasticity number. The amount of hydroxyl endblocking left in the polymer is judged by an activity test in which a sample of the polymer is dissolved in toluene, then mixed with ethylorthosilicate crosslinker and dibutyltindiacetate catalyst. This mixture is placed in a viscosity tube at a temperature of 25° C. and the viscosity measured at 10 minutes after catalyzation and at 20 minutes after catalyzation. The viscosity at the two times is the plotted on a chart and the slope of the line is determined. The procedure is repeated and the average of the two slopes is reported as the activity of the polymer. The higher the activity number, the more hydroxyl radical is present in the polymer to be reacted with the crosslinker. The number average and weight average molecular weights of the various polymers were also measured as shown in Table I.

TABLE I

| Dew Point °C. | Plasticity Number | Activity | Mn | Mw |
|---|---|---|---|---|
| 0 | 94 | 82.9 | 163000 | 391000 |
| −10 | 112 | 66 | 180000 | 464000 |
| −20 | 145 | 42.8 | 262000 | 632000 |
| −30 | 158 | 34.9 | 289000 | 686000 |
| −40 | 175 | 22.5 | 332000 | 771000 |

Since the amount of endblocker and catalyst was kept constant, the changes in the polymer shown above are due to the varying amount of hydroxyl endblocker formed as the equilibrium moisture vapor pressure in the mixer during polymerization was varied.

That which is claimed is:

1. A method for controlling the amount of silanol ends remaining after the polymerization of diorganocyclosiloxane in the presence of acid or base catalyst comprising,
(A) polymerizing, in a sealed container having an inert gaseous sweep of controllable water vapor pressure, diorganocyclosiloxane in the presence of acid or base catalyst under conditions of controlled water vapor pressure. the dew point of the exiting gaseous sweep being less than −10° C. then (B) terminating the polymerization process and neutralizing the catalyst before exposure to uncontrolled water vapor in the atmosphere.

2. The method of claim 1 in which the catalyst is a base.

3. The method of claim 2 in which the catalyst is potassium silanolate.

4. The method of claim 2 in which the catalyst is neutralized with an acid.

5. The method of claim 3 in which the catalyst is neutralized with dimethylvinylsilylacetate.

6. The method of claim 1 in which the exiting gaseous sweep has a dew point of less than $-30°$ C.

* * * * *